Nov. 10, 1931.   R. W. BAKER   1,831,283
CONVEYING APPARATUS
Filed Aug. 13, 1928   5 Sheets-Sheet 2
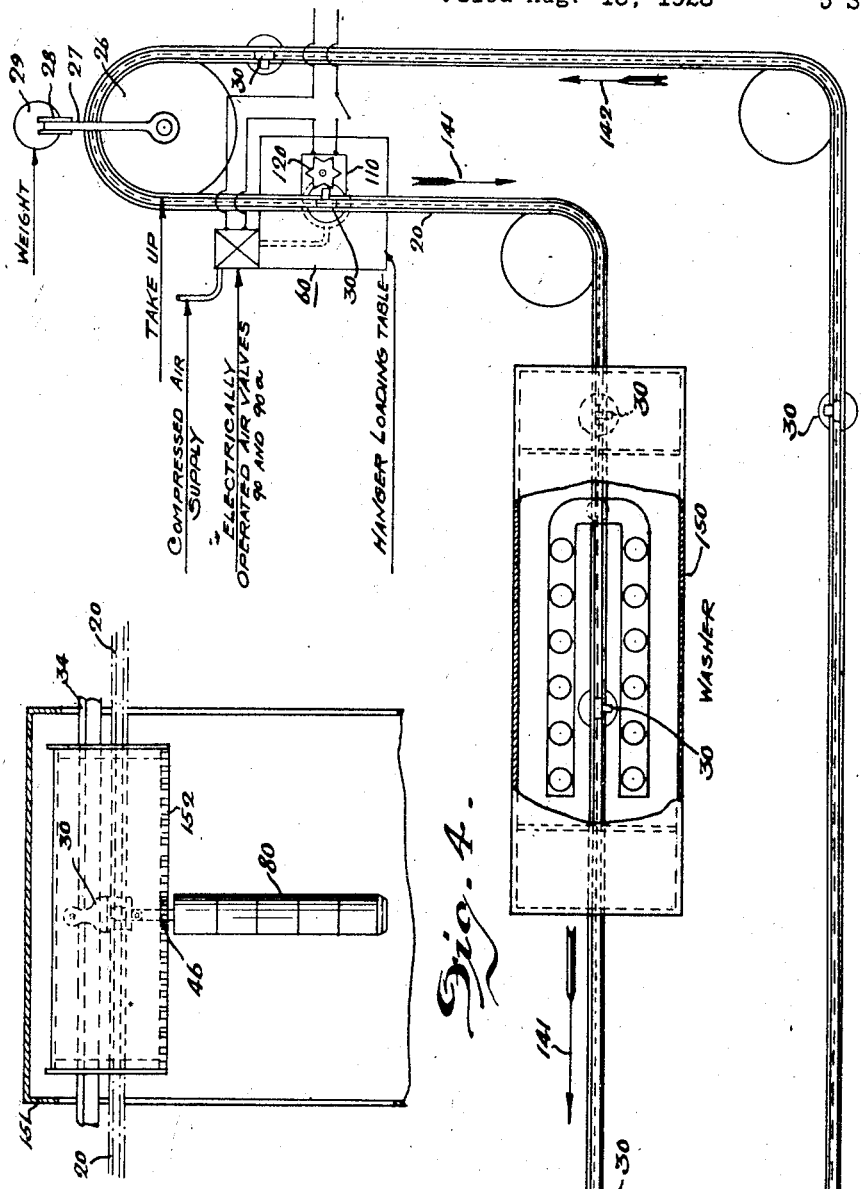
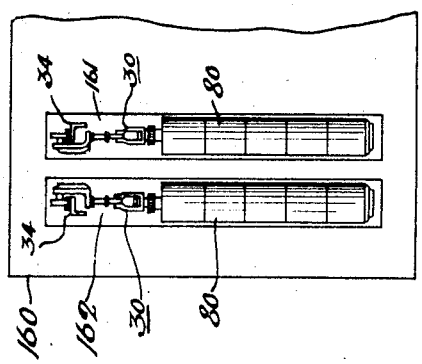
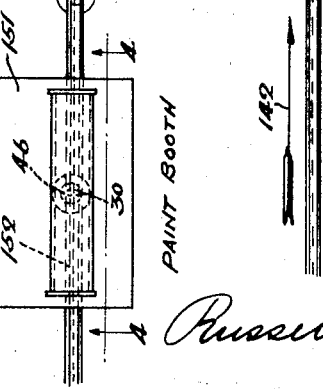
Inventor
Russell W. Baker
By Spencer Hardman & Fehr
his Attorneys Nov. 10, 1931.  R. W. BAKER  1,831,283
CONVEYING APPARATUS
Filed Aug. 13, 1928  5 Sheets-Sheet 3

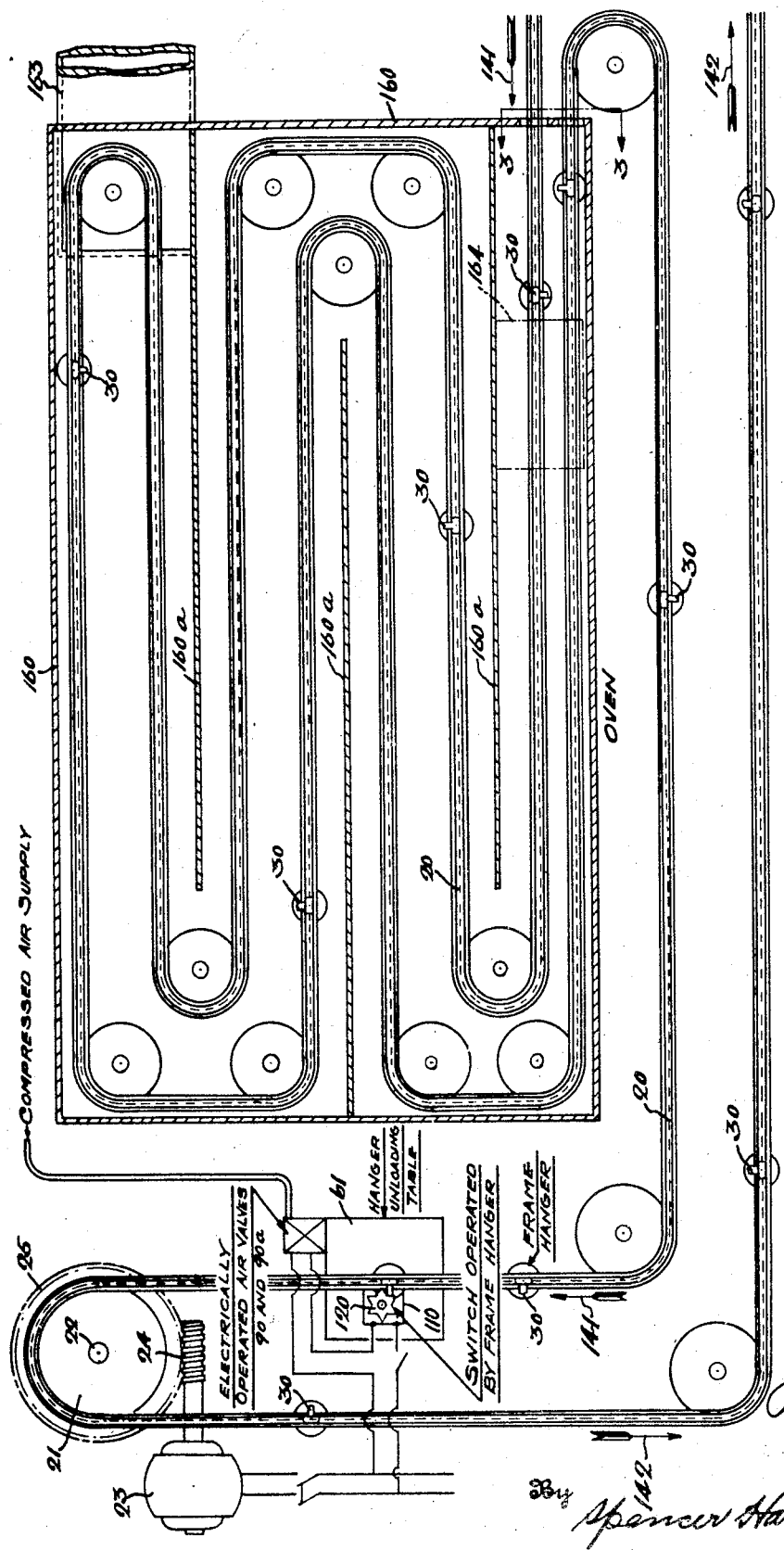

Inventor
Russell W. Baker
By Spencer Hardman & Fehr
his Attorneys

Inventor
Russell W. Baker
By Spencer Hardman & Fehr
his Attorneys

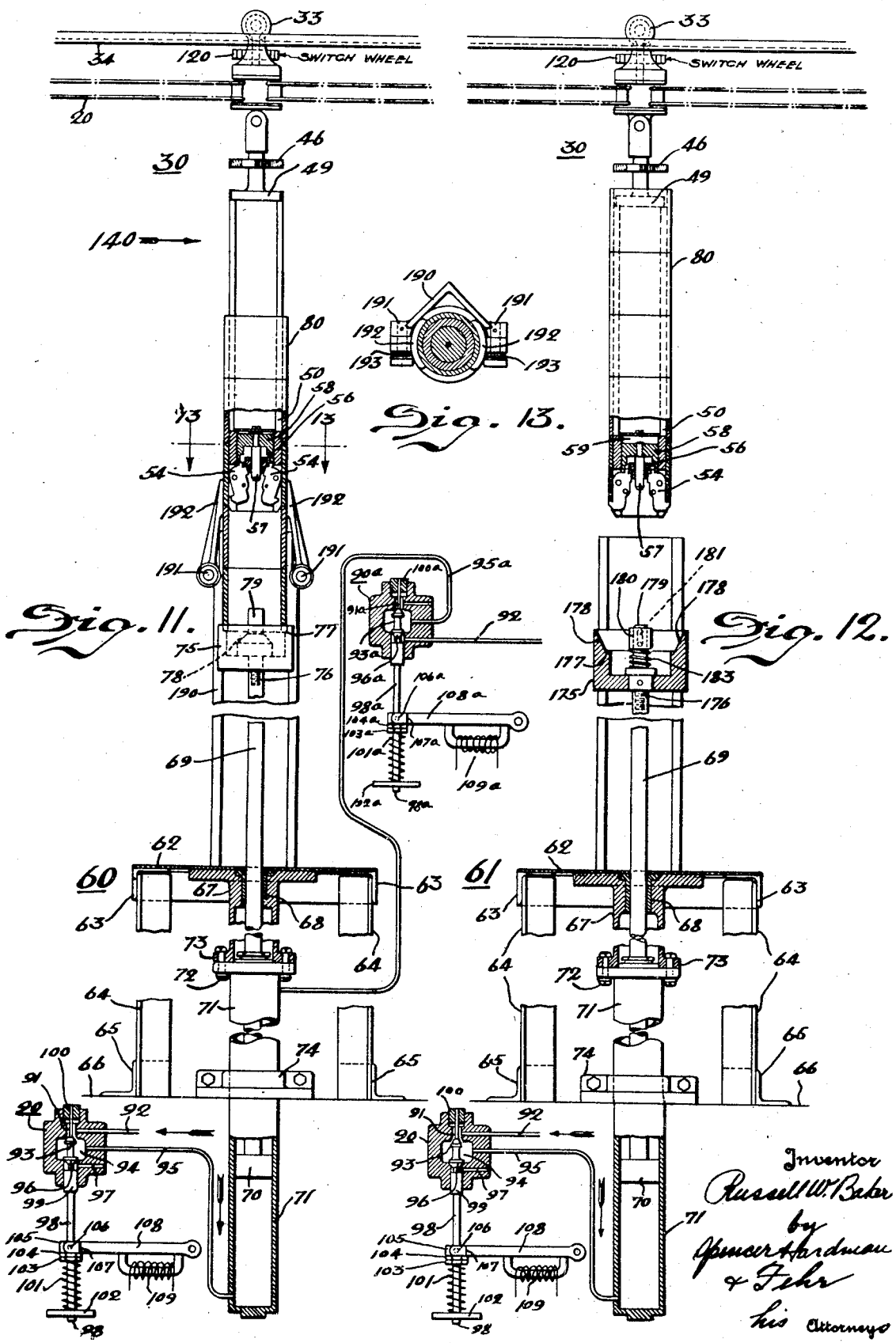

Patented Nov. 10, 1931

1,831,283

UNITED STATES PATENT OFFICE

RUSSELL W. BAKER, OF ANDERSON, INDIANA, ASSIGNOR TO DELCO-REMY CORPORATION, OF DAYTON, OHIO, A CORPORATION OF DELAWARE

CONVEYING APPARATUS

Application filed August 13, 1928. Serial No. 299,253.

This invention relates to work handling apparatus, and particularly to the handling of stacks of tubular bodies, such as the field frames of dynamos. More particularly, the present invention relates to improvements in the work handling apparatus shown in the patent of Rodger J. Emmert, No. 1,753,560, issued April 8, 1930.

In the Emmert application referred to, one of the objects of the invention is to convey work pieces with a minimum of manual labor and supervision, successively, to various devices which operate upon the work pieces. In carrying out this object, the invention provides an endless conveyor having a plurality of carriages for receiving stacks of work pieces, a loading platform and an unloading platform. Work pieces are stacked upon the loading platform and are automatically transferred to the carriage adjacent the loading table. After the work pieces on the carriage have been operated upon, and it is desired to remove them from the conveyor, the carriage moves adjacent an unloading platform and the work pieces on the carriage are automatically transferred from the carriage to the unloading platform.

One of the objects of the present invention is to provide certain improvements in the carriages or hangers for receiving the stacks of work pieces whereby the latches which retain the work pieces upon the hangers are positively locked in operative position in order to avoid the possibility of the work pieces dropping from the hangers while they are being transferred from the loading platform to the unloading platform. In this connection, it is a further object of the invention to provide improvements in the loading platform whereby the latches will be automatically moved into retaining position and will be automatically locked in retaining position during movement of the loading platform upwardly toward the hanger. A further object of the invention is to provide improvements in the unloading platform, whereby during upward movement of the unloading platform to receive the work pieces, the latches will be unlocked and then moved into position for permitting the work pieces to descend by gravity upon the unloading platform.

Further objects and advantages of the present invention will be apparent from the following description, reference being had to the accompanying drawings, wherein a preferred form of embodiment of the present invention is clearly shown.

In the drawings:

Figs. 1 and 2 form a diagram showing a plan of the work handling apparatus included in the present invention.

Fig. 3 is a sectional view on the line 3—3 of Fig. 1.

Fig. 4 is a sectional view on the line 4—4 of Fig. 2.

Figs. 11 and 12 are side views partly in section, showing respectively how the loading and unloading platforms cooperate with the carriages.

Fig. 13 is a sectional view on the line 13—13 of Fig. 11.

Figure 5:
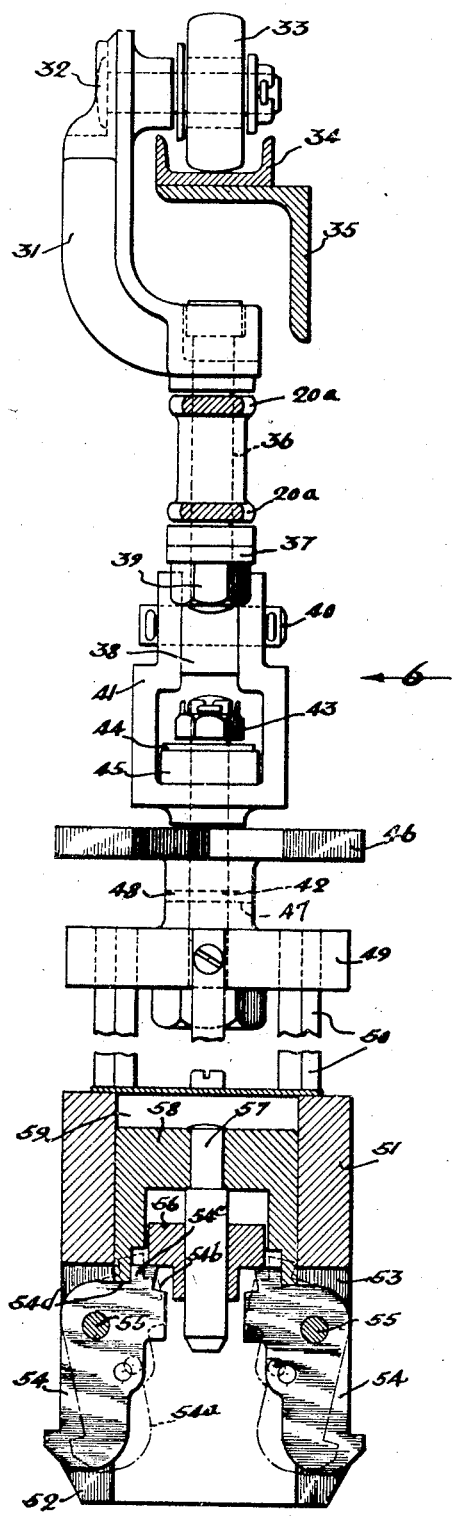
Fig. 5 is a side elevation of a conveyor carriage, showing the conveyor track in cross-section, and showing certain parts of the carriage in section.

Referring first to Figs. 1 and 2, the conveyor comprises an endless chain represented by the broken line 20. The chain is rove around a plurality of sprocket wheels for changing the direction of the chain. One of these wheels is indicated at 21 in Fig. 1, and is connected with a shaft 22 which is operated by an electric motor 23 through a worm 24 and a worm gear 25. Another of the chain-guiding pulleys is indicated by numeral 26 in Fig. 2. This pulley 26 is the take-up pulley and is slidably mounted, and its axis is connected by a cable 27 which passes around a suitably mounted pulley 28 and thence downwardly to a weight 29 which maintains the conveyor chain 20 under tension.

Figure 6:
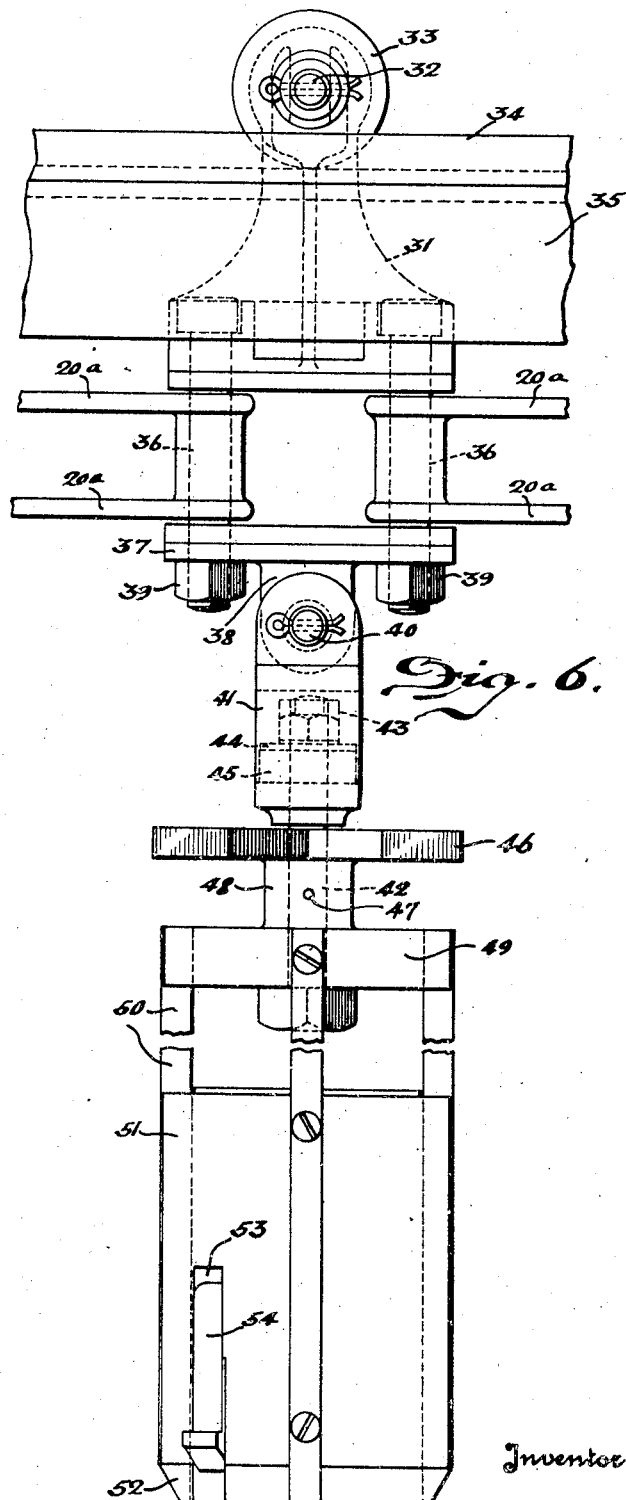
Fig. 6 is a view in the direction of arrow 6 in Fig. 5.
Figure 7:
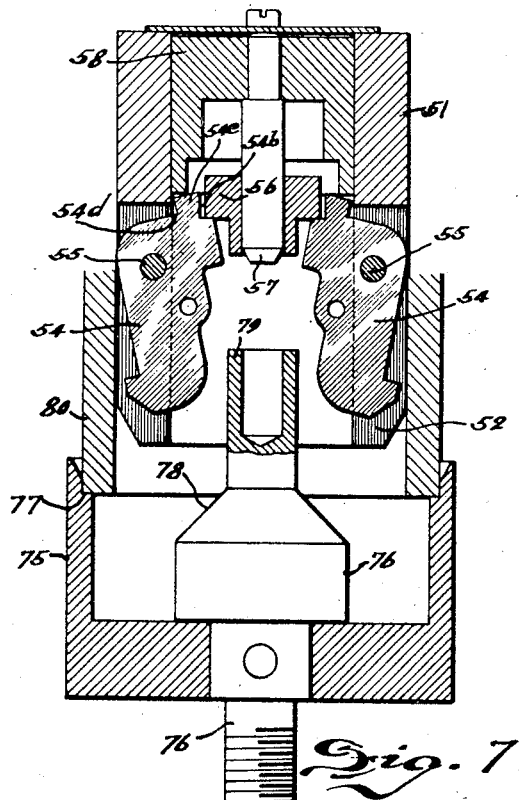
Figs. 7, 8 and 9 are fragmentary, vertical, sectional views of the hanger and elevating platform showing, respectively, the latches in non-retaining position the latches in retaining position but not locked, and the latches in retaining position and locked.

The conveyor chain moves a plurality of hangers 30, each including a bracket 31 carrying a pin 32 supported by a wheel 33 which travels in a track 34 of channel-shaped cross-section. The track 34 conforms with the direction of the chain 20, and is supported in any suitable manner, as by angle irons 35 which may be suspended from the ceiling of the room in which the apparatus is located. The bracket 31 supports two bolts 36 which pass through holes in the adjacent chain links 20a, as shown in Fig. 6. The lower ends of the bolts 36 pass through a plate 37 having a lug 38; and plate 37 is supported by the upper sides of nuts 39 threadedly engaging the lower ends of bolts 36. The lug 38 carries a pin 40 passing through the branches of a swivel link 41, the yoke of which is perforated to receive a bolt 42. The upper end of the bolt 42 threadedly engages a nut 43, and nut 43 rests on a washer 44 supported by a boss 45 integral with the yoke of link 41. The rod 42 is connected with a gear 46 by pin 47 and the hub 48 of the gear 46 is provided with a flange 49 at its lower end. Spacing bars 50 connect the flange 49 with a latch frame 51 having its lower edge beveled to provide a conical surface 52. The latch frame is tubular and is provided with diametrically opposite notches 53, each for receiving a latch lever 54 supported by a pin 55 which extends across the notch 53. Each lever 54 is movable into the full-line position shown in Fig. 5, or to the dotted-line position 54a. The latches 54 are positively locked in non-operating position as shown in Fig. 7 by a block 56 which moves by gravity into notches 54b provided by the latches. The block 56 is slidable along a stud 57 attached to a block 58 which is guided by the walls of a recess 59 within the latch frame 51. The latches 54 are locked in work retaining position shown in Fig. 5 due to the fact that the lower edge of the block 58 is received by notches 54d provided by the latches. The operation of the locking blocks 56 and 58 will be described later.

Figure 8:
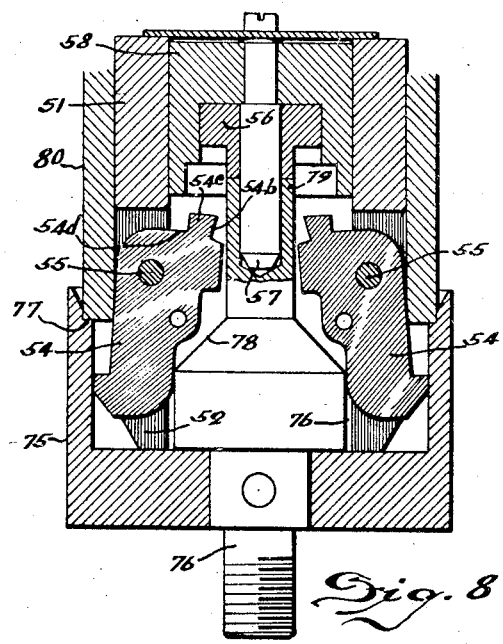
Figure 9:
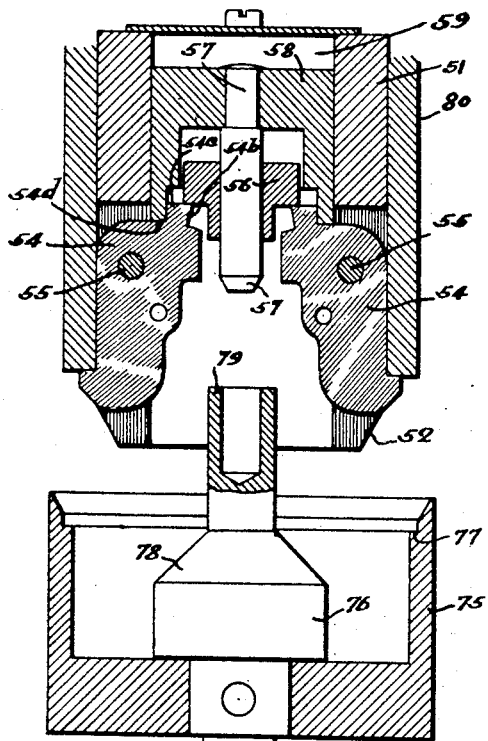

The hangers 30 are adapted to cooperate with the elevating platform of the loading table 60, shown diagrammatically in Fig. 2, or with the transfer platform of the unloading table 61, indicated in Fig. 1. The loading table 60 will first be described with reference to Fig. 11. The table 60 includes a top 62 supported by a frame work of angle iron sides 63 and angle iron legs 64 which are secured by angle bracket 65 to the floor 66. The table top 62 supports a guide bracket 67 carrying a guide bushing 68 for a piston rod 69 attached at its lower end to a piston 70 which reciprocates in a cylinder 71 attached by bolts 72 to the flange 73 of the guide bracket 67. The cylinder 71 is also supported by a clamp bracket 74 supported by the floor 66. The rod 69 is threadedly connected with a screw 76 which is attached to elevating platform 75 providing an annular ledge 77 for receiving a stack of cylindrical work pieces or dynamo field frames 80. The head of the screw 76 is provided with a conical portion 78 for the purpose of engaging the latches 54 in order to move them from the position shown in Fig. 7 to the position shown in Fig. 8. The screw 76 is provided also with a tubular extension 79 which operates to move the locking block 56 upwardly away from the latches 54 as shown in Fig. 8. When the elevating platform 75 is retracted from the hanger as shown in Fig. 9 the latches 54 will be positively locked in position for retaining the work pieces 80 by the locking block 58 which has moved by gravity from the position shown in Fig. 8 to the position shown in Fig. 9 so that its lower edge will be received by the notches 54d provided by the latches. The locking block 56 is inoperative as it merely rests upon the lugs 54c of the latches 54.

Figure 10:
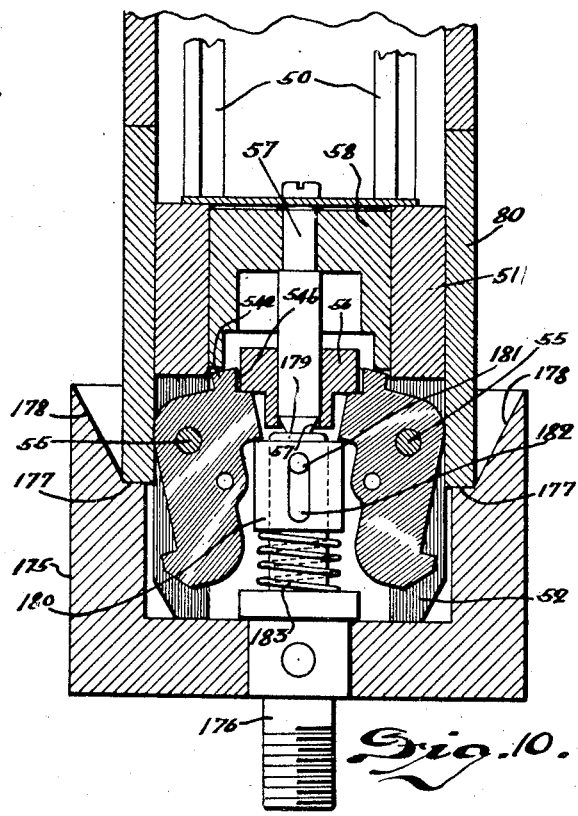
Fig. 10 is a fragmentary, vertical, sectional view of the hanger and unloading platform showing the latches in non-retaining position and locked in said position.

The unloading table 61 differs from the loading table 60 in that the piston rod 69 associated therewith is threadedly connected with a screw 176 attached to a lowering platform 175 provided with a ledge 177 for receiving the work pieces 80, when released. The work pieces 80 are guided onto the ledge 177 by reason of the flaring conical surface 178. During upward movement of the transfer platform 175 to receive the work pieces, the upper end portion 179 of the screw 176 will engage the stud 57 and will move the same upwardly into the position shown in Fig. 10 thereby moving the locking block 58 upwardly in order to release the latches 54. While this is going on a collar 180 will be yieldingly pressed upwardly by a spring 183 against the latches 54 in order to move them from the position shown in Fig. 9 to the position shown in Fig. 10. Separation of the collar 180 from the screw extension 179 is limited by a pin 181 extending diametrically across the screw extension 179 and having its ends received by the slots 182 in the collar 180. Movement of the latches 54 into the position shown in Fig. 10 will move the latch extensions 54c away from the locking block 56 to permit the latter to descend into the notches 54b of the latches 54. Thus the unloading transfer platform causes the latches to be automatically locked in non-latching position.

Referring again to Fig. 11, the admission of fluid pressure to the lower end of the cylinder 71, is controlled by a valve 90 having an intake port 91 connected with a compressed air inlet 92. The port 91 includes a valve seat for receiving an inlet valve 93 controlling the admission of fluid to the chamber 94 which is connected by a pipe 95 with the lower end of the cylinder 71. When the valve 93 is in closed position, an exhaust valve 96 is separated from its seat in order to provide for the passage of fluid from the cylinder 71 through pipe 95, chamber 94 and out through an exhaust passage 97. The valves 93 and 96 are integral with, or connected with, a valve stem 98 having cylindrical portions 99 and 100 which are guided by the frame of valve 90. The valve 93 is normally closed and the valve 96 is normally maintained open by a spring 101 which bears at its lower end against a bracket 102 and at its upper end against a nut 103 threadedly connected with the rod 98. The bracket 102 also provides a guide for the stem 98. A nut 104 is threadedly connected with the stem 98 and receives a block 105 carrying diametrically-opposite pins 106. Each pin 106 is connected with a branch 107 of a fork lever 108, which cooperates as an armature with an electromagnet 109. It is apparent that when the magnet 109 is energized, the armature 108 will be pulled downwardly to cause the valve 93 to open and the valve 94 to close. When this occurs, air under pressure will be delivered to the cylinder 71 to cause the transfer table 75 or 175 to be elevated, so as to transfer the work to the hanger or from the hanger, depending on whether the hanger is at the loading station or at the unloading station.

The admission and exhaust of compressed air from the upper end of each of the cylinders 71 is controlled by a valve 90a, similar to valve 90, and controlled by an electromagnet 109a which is energized simultaneously with the magnet 109 controlling the same cylinder. A pipe 95a leading to the upper end of each cylinder 71 is connected with valve 90a at the middle side opening thereof, but the air supply pipe 92 is connected with the lower side opening of the valve 90a instead of the upper side opening, as is the case with the connection of parts 90 and 92. Therefore, when the magnets 109 and 109a, controlling the same cylinder, are energized, as indicated in Fig. 11, air will be admitted to the lower end of the cylinder 71 to raise the piston 70 therein, and air will be exhausted from the upper end of the cylinder. Similarly, air will be admitted to the upper end of the cylinder and exhausted from the lower end when the magnets are deenergized and the springs 101 and 101a return the valve members 93 and 93a, respectively, to their normal positions.

The circuit of the magnets 109 and 109a, controlling the loading platform 75, is controlled by a switch 110 shown in Fig. 1 and operated by a star-wheel 120 adapted to be engaged and moved by the hanger bracket 31.

Referring more particularly to Figs. 11 and 12, it will be noted that the loading table 60 and the unloading table 61, and controls therefor, are identical, the only difference being in the construction of the transfer platforms 75 and 175. As the hanger 30, shown in Fig. 11, moves in the direction of the arrow 140, it will operate the switch star-wheel 120 so as to cause the magnets 109 and 109a to be energized to cause the platform 75 to be elevated. The switch 110 is located relative to the loading table 60 so that when air is admitted to the cylinder 71, the hanger 30 will be located substantially vertically above the transfer platform 75 as shown diagrammatically in Fig. 2. The wheel 120 will operate first to close the switch so that the transfer platform 75 will move upwardly as represented in Figs. 7 and 11 and thus be elevated into the position shown in Fig. 8. The camming portion 78 thereof will engage the latch-levers 54 to move them from the position shown in Figs. 7 and 11 to the position shown in Fig. 8, thereby causing the levers to engage the lower edge of the lowest one of the stack of tubular bodies 80 and causing the levers to be locked in retaining position. As the hanger 30 travels still further in the direction of the arrow 140, the switch wheel 120 will operate to open the switch, thereby causing the platform 75 to descend so that another stack of work pieces 80 may be loaded thereon before the next hanger 30 has been moved adjacent the loading table 60.

The unloading apparatus works in a manner opposite from that of the loading apparatus. The hanger 30 moves a switch wheel 120 which controls a pair of magnets 109 and 109a, controlling valves 90 and 90a in the manner described in connection with the loading table 60, but the upward movement of the sleeve 180 of the unloading platform 175 with the latching levers 54 causes them to be moved from the position shown in Fig. 12 to the position shown in Fig. 10 so that they will no longer retain the stack of work pieces 80 upon the hanger 30. Therefore, when the switch wheel 120 located adjacent the unloading table 61 is operated by a hanger 30 to open the magnet circuits, the transfer platform 175 will be caused to descend and carry with it the stack of work pieces 80 which are removed therefrom before the next hanger, laden with work pieces, comes vertically adjacent the unloading table 61.

In order to facilitate the stacking of work pieces 80 upon the elevating platform 75, the table 60 is provided with an angle bar guide 190 set in a vertical position as shown in Figs. 11 and 13. The angle bar guide 190 is so located that the work pieces will be stacked vertically when they are placed against the leg of the angle bar. Adjacent its upper end, the angle bar 190 supports arms 192 which are pivoted at 191 and which are urged by coil springs 193 in opposite directions and toward the stack of work pieces. These arms operate to guide the work pieces onto the hanger during the upward movement of the elevating table 75. The operator may place the lower end of a hanger, which is travelling empty toward the elevating table, between the arms 192 so that these arms will be operative to guide the stack of work pieces although the upward movement of the elevatting table 75 should begin slightly before the hanger is in vertical alignment with the piston 69 of the elevating table.

Figs. 1 and 2 show the work handling apparatus applied to a plant for cleaning and painting the exteriors of tubular bodies, such as the field frames of dynamo-electric machines. A workman stands adjacent the loading table 60 and places on the loading transfer platform 75 a stack of five field frames. These frames are transferred automatically to one of the hangers 30 in the manner described, and the conveying chain 20 moves the hangers 30 in the direction of the arrows 141 first through a washer 150, which cleans the exteriors of the field frames preparatory to taking a coat of paint, and then through a paint booth 151. As each hanger 30 moves through the paint booth 151, its gear 46 engages a rack 152 suspended within the paint booth in such a manner as to engage the gear 46. As the hanger 30 is pulled through the paint booth 151, the gear 46 and the work pieces 80 will be rotated so as to facilitate the application of paint to the exteriors of the work pieces by means of an air brush. Then the work pieces are conveyed through an inlet door 161 of a drying oven 160, which is heated by hot air entering through a duct 163, passing around baffles 160a, and passing out through a duct 164 in the top of the oven. The work pieces are carried from the inlet opening 161 slowly toward the hottest part of the oven, during which time they are heated by work pieces which are travelling from the hottest part toward the outlet door 162. As each hanger comes to a certain point adjacent the unloading table 61, the switch wheel 120 adjacent thereto is operated to cause the transfer platform 75a to function in the manner described in order to remove the work pieces automatically from the hanger. The empty hangers move in the direction of arrows 142 to the loading table 60.

It is apparent by means of the present invention that a large number of work pieces can be rapidly conveyed from a table upon which they are stacked, to a series of devices where the pieces are operated upon. The only manipulation required is that of stacking the pieces upon the loading table and removing them from the unloading table. The stacking of work pieces at the loading table is performed by the inspector who is normally employed to inspect the work pieces just before they are ready to be painted, in order to determine whether they are fit to be painted or should be rejected. The work pieces are removed from the transfer platform at the unloading table by the inspector normally employed to inspect the coating of paint to determine whether the painting is satisfactory or the piece should be rejected and repainted. It is apparent, therefore, that the cost of handling the work pieces from the time they are inspected before painting, until they are inspected after painting, has been entirely eliminated, since no manual labor is involved other than inspection which is necessary regardless of the method of handling the work pieces. Therefore, the cost of making work pieces of this type has been materially reduced.

While the form of embodiment of the present invention as herein disclosed, constitutes a preferred form, it is to be understood that other forms might be adopted, all coming within the scope of the claims which follow.

What is claimed is as follows:

1. Work handling apparatus comprising, in combination, an unloading table, a conveyor having a work hanger which travels above the table, means for positively locking the work pieces upon the hanger, means for moving the table toward the hanger in order to receive work pieces from the hanger, and means for releasing the work piece locking means automatically in response to movement of the table.

2. Work handling apparatus comprising, in combination, an unloading table, a conveyor having hangers which travel adjacent the table, means for positively locking work pieces upon the hanger, and devices for automatically causing the unloading table to move toward the hanger in order to transfer work pieces from the hanger to the unloading table and for automatically releasing the work piece locking means, said devices operating automatically in response to movement of the hanger into a certain position relative to the unloading table.

3. Work handling apparatus comprising, in combination, a conveyor having work supporting devices each provided with a member movable into different positions for respectively retaining or releasing the work pieces, a table having a platform for receiving work pieces and movable toward and away from a supporting device, means for producing movement of the platform, a movable locking member for locking the same in non-operating position, a movable locking member urged toward the retaining member for locking the same in work-retaining position, and means operated by the platform for retracting the first mentioned locking member from the retaining member and for moving the retaining member into work-retaining position; and other means for retracting the second mentioned locking member from the work-retaining member.

4. Work handling apparatus comprising, in combination, a conveyor having work supporting devices each provided with a member movable into different positions for respectively retaining or releasing the work pieces, a table having a platform for receiving work pieces and movable vertically toward and away from a supporting device, means for producing movement of the platform, two gravity operated locking members movable respectively into locking engagement with the work-retaining member when in its respective positions, means operated by the table for lifting one of the locking members, and then moving the work-retaining member into a different position, and other means for lifting the other locking member from the work-retaining member.

5. Work handling apparatus comprising, in combination, a conveyor having work supporting devices each having a member movable into different positions for respectively retaining or releasing the work pieces and each having devices for positively locking the work retaining member in retaining or releasing positions, tables having similar work supporting transfer platforms movable toward and away from the supporting devices, similar apparatuses for producing movement of the table platforms toward and away from the supporting devices, similar controlling devices responsive to movement of the supporting devices for causing the apparatuses to operate to move platforms toward the supporting devices and then to release the platforms to permit the platforms to recede from the supporting devices; means provided by the elevating platform and operable upon upward movement thereof first to unlock the work piece retaining member and to move it from its releasing to its retaining position, and means provided by the lowering platform and operable upon upward movement thereof first to unlock the work piece retaining member and to move it from its retaining to its releasing position.

6. Work handling apparatus comprising, in combination, a conveyor including a carriage; a work-retaining latch on the carriage; means for positively locking the latch in retaining and in non-retaining positions; means controlled by the movement of the conveyor for conveying work pieces to the carriage and for operating the locking means and then moving the latch into retaining position; and other means controlled by the movement of the conveyor for operating the locking means and then moving the latch into non-retaining position, and for conveying work pieces away from the carriage.

7. Work handling apparatus comprising, in combination, a conveyor including hangers; a gripping latch at the free end of each hanger; an elevator including a platform upon which a plurality of cylindrically shaped work pieces are adapted to be placed in stacked relation; means for operating the elevator to move the work pieces about the hanger whereby the gripping latch will engage the lowest work piece to retain said stack upon the hanger; means for positively locking the latch in retaining position; a lowering platform adapted to receive a stack of work pieces, said platform having means for unlocking the latch and for moving the gripping latch to release the work pieces from the hanger whereby the lowering of the platform will remove the stack of work pieces from the hanger; and devices controlled by the operation of the conveyor to control the operation of the two platforms in accordance with the position of the hangers.

8. Work handling apparatus comprising, in combination, a conveyor including a hanger; a latch for securing work pieces upon the hanger; a member for positively locking the latch in movable work retaining positions; a work transfer device for placing work pieces upon the hanger; means for causing the latch to be locked automatically in work retaining position in response to movement of the work transfer device; a movable work transfer device for receiving work pieces from the hanger; means operated by movement of the receiving device for automatically unlocking the latch and for moving it into work releasing position; and means for operating the transfer devices.

9. Work handling apparatus comprising, in combination, a conveyor having a hanger for receiving work pieces; a work-retaining latch upon the hanger and movable into retaining and non-retaining positions; two locking members supported by the hanger and movable upon the latch, one lockingly engaging the latch when in work-retaining position and the other lockingly engaging the latch when in non-retaining position; a conveyor for moving work pieces to the hanger and devices movable therewith for retracting the locking member which locks the latch in non-retaining position, and then for moving the latch into retaining position; and a conveyor for removing work pieces from the hanger and devices movable therewith for retracting the locking member which locks the latch in work-retaining position and then for moving the latch into non-retaining position.

10. Work handling apparatus comprising, in combination, a conveyor having a hanger; a latch carried by the hanger and movable into work-retaining and non-retaining positions; two locking members movable upon the latch and respectively lockingly-engaging the latch when in work-retaining and non-retaining positions; a transfer conveyor for moving work pieces to the hanger and devices carried thereby for retracting both locking members and for moving the latch into work-retaining position and for holding the latch in said position until after the latch is locked in this position; a second transfer conveyor for removing work pieces from the hanger and devices carried thereby for retracting only the locking member which locks the latch in work-retaining position and for then moving the latch into non-retaining position.

11. Work handling apparatus comprising, in combination, a conveyor having a hanger adapted to extend through a stack of tubular work pieces and carrying at its lower end a tubular latch bracket; a pair of oppositely disposed latches pivotally supported by the side wall of the bracket, and movable from a non-retaining position within the outer surface of the bracket to a work-retaining position under the stack of work-pieces; a locking member guided for vertical sliding movement by the latch bracket and having a downwardly extending annular flange which, when the latches are in work-retaining position, is received concurrently by recesses in the latches; a rod carried centrally by the locking member and extending downwardly and within the annular flange; a second locking member surrounding the rod and guided for vertical sliding movement thereby and having an outwardly extending circular flange which, when the latches are in non-retaining position, is received, concurrently by other recesses in the latches; a transfer conveyor for moving work pieces to the hanger and devices carried thereby for retracting both locking members and for moving the latches into work-retaining position and for holding the latches in said position until after the latches are locked in this position; a second transfer conveyor for removing work pieces from the hanger and devices carried thereby for retracting only the first mentioned locking member and for then moving the latches into non-retaining position.

In testimony whereof I hereto affix my signature.

RUSSELL W. BAKER.